United States Patent

Baudu et al.

[11] Patent Number: 5,960,626
[45] Date of Patent: Oct. 5, 1999

[54] ELECTRIC CONTROL SYSTEM FOR A TURBOJET ENGINE THRUST REVERSER INCLUDING AN ELECTROMECHANICAL DRIVE DEVICE AND A LOCKING DEVICE WHICH ARE CONTROLLED BY AN ELECTRONIC CONTROL UNIT

[75] Inventors: Pierre André Marcel Baudu, Le Havre; Patrick Gonidec, Montivilliers; Guy Bernard Vauchel, Le Havre, all of France

[73] Assignee: Societe Hispano Suiza, Paris, France

[21] Appl. No.: 08/968,062

[22] Filed: Nov. 12, 1997

[30] Foreign Application Priority Data

Nov. 14, 1996 [FR] France .................................. 96 13861

[51] Int. Cl.⁶ ................................. F02K 3/02; F02K 1/76
[52] U.S. Cl. ......................... 60/226.2; 60/230; 244/110 B
[58] Field of Search ..................... 60/226.2, 230, 60/39.091; 244/110 B; 239/265.19, 265.25, 265.27, 265.29, 265.31

[56] References Cited

U.S. PATENT DOCUMENTS

| | | |
|---|---|---|
| 3,764,096 | 10/1973 | Wright . |
| 3,931,944 | 1/1976 | Capewell et al. ........................ 60/230 |
| 4,185,798 | 1/1980 | Dickerson . |
| 4,424,669 | 1/1984 | Fage ........................................ 60/230 |
| 4,437,783 | 3/1984 | Halin et al. . |
| 4,522,358 | 6/1985 | Dinger et al. ....................... 244/110 B |
| 4,543,783 | 10/1985 | Greune et al. ......................... 60/226.2 |
| 4,754,694 | 7/1988 | Martin . |
| 5,404,714 | 4/1995 | Davies .................................. 60/226.2 |
| 5,448,884 | 12/1995 | Repp . |
| 5,547,130 | 8/1996 | Davies .................................. 60/226.2 |
| 5,819,527 | 10/1998 | Fournier ............................... 60/226.2 |
| 5,826,823 | 10/1998 | Lymons et al. ..................... 244/110 B |

FOREIGN PATENT DOCUMENTS

| | | |
|---|---|---|
| 0 076 750 | 4/1983 | European Pat. Off. . |
| 2 435 604 | 4/1980 | France . |
| 2 116 129 | 9/1983 | United Kingdom . |
| 2 154 291 | 9/1985 | United Kingdom . |
| WO 94/07018 | 3/1994 | WIPO . |

Primary Examiner—Ted Kim
Attorney, Agent, or Firm—Bacon & Thomas PLLC

[57] ABSTRACT

An electric control system is disclosed for a turbojet engine thrust reverser having at least one movable component movable between a forward thrust position and a reverse thrust position, the control system having at least one electromechanical drive device mechanically connected to the moveable component such that actuation of the electromechanical drive device moves the component between the forward and reverse thrust positions, and an electronic control unit electrically connected to the electromechanical drive device and to a turbojet engine control system to transmit actuation signals to the electromechanical drive device to control the movement of the component between the forward and reverse thrust positions. The electronic control system preferably also has at least one electrically actuated locking device to hold the movable component in the forward thrust position.

14 Claims, 1 Drawing Sheet

ELECTRIC CONTROL SYSTEM FOR A TURBOJET ENGINE THRUST REVERSER INCLUDING AN ELECTROMECHANICAL DRIVE DEVICE AND A LOCKING DEVICE WHICH ARE CONTROLLED BY AN ELECTRONIC CONTROL UNIT

BACKGROUND OF THE INVENTION

The present invention relates to an electric control system for an aircraft turbojet engine thrust reverser, the thrust reverser having a movable component movable between a forward thrust position and a reverse thrust position. The thrust reverser may be a pivoting door-type, a cascade-type or a clamshell door-type thrust reverser.

Thrust reversers for aircraft turbojet and turbofan engines are well-known in the art and typically have displaceable components, such as pivoting doors, movable between forward and reverse thrust positions by a hydraulic control system. A typical hydraulic control system is described in French Patent 2 435 604. A typical hydraulic control system comprises linear hydraulic actuators connected to the thrust reverser movable component, primary and secondary mechanical and hydraulic locking means to keep the thrust reverser movable components in their locked positions, a hydraulic control unit and associated hydraulic conduit lines.

Such known systems require generating high hydraulic power tapped from the hydraulic circuit of the aircraft, and the geometric limitations placed on the hydraulic drive means does not always enable the closing of the movable thrust reverser component throughout the full flight envelope of the aircraft. Such inability may result in the premature deployment of the thrust reverser to the reverse thrust position in the event of a malfunction of the primary and secondary locks.

The hydraulic fluid utilized in the known hydraulic systems is very corrosive and very flammable. The use of this hydraulic fluid creates maintenance problems and the location of the hydraulic lines in the vicinity of the fan in the turbofan engine requires additional protection of the forward thrust reverser mounting frame and of the associated hydraulic equipment. The compactness of the forward thrust reverser mounting frame enables the hydraulic plumbing to be located only with great difficulty.

SUMMARY OF THE INVENTION

An electric control system is disclosed for a turbojet engine thrust reverser having at least one movable component movable between a forward thrust position and a reverse thrust position, the control system having at least one electromechanical drive device mechanically connected to the moveable component such that actuation of the electromechanical drive device moves the component between the forward and reverse thrust positions, and an electronic control unit electrically connected to the electromechanical drive device and to a turbojet engine control system to transmit actuation signals to the electromechanical drive device to control the movement of the component between the forward and reverse thrust positions.

The electric control system according to the present invention solely employs electromechanical devices drawing electric power either from the aircraft electric power system or from a generator driven by the aircraft engine thereby eliminating the problems caused by the use of hydraulic equipment and the associated hydraulic fluid.

The present control system comprises electromechanical drive devices, typically a linear electric actuator, driving the movable thrust reverser component, at least one electrically actuated locking device to hold the movable component in a forward thrust position, and a plurality of sensors for sensing the positions of the drive means, the movable components and the primary lock. The system may also include secondary and tertiary electrically actuated locks.

DETAILED DESCRIPTION OF THE PREFERRED EMBODIMENT

Figure 1:
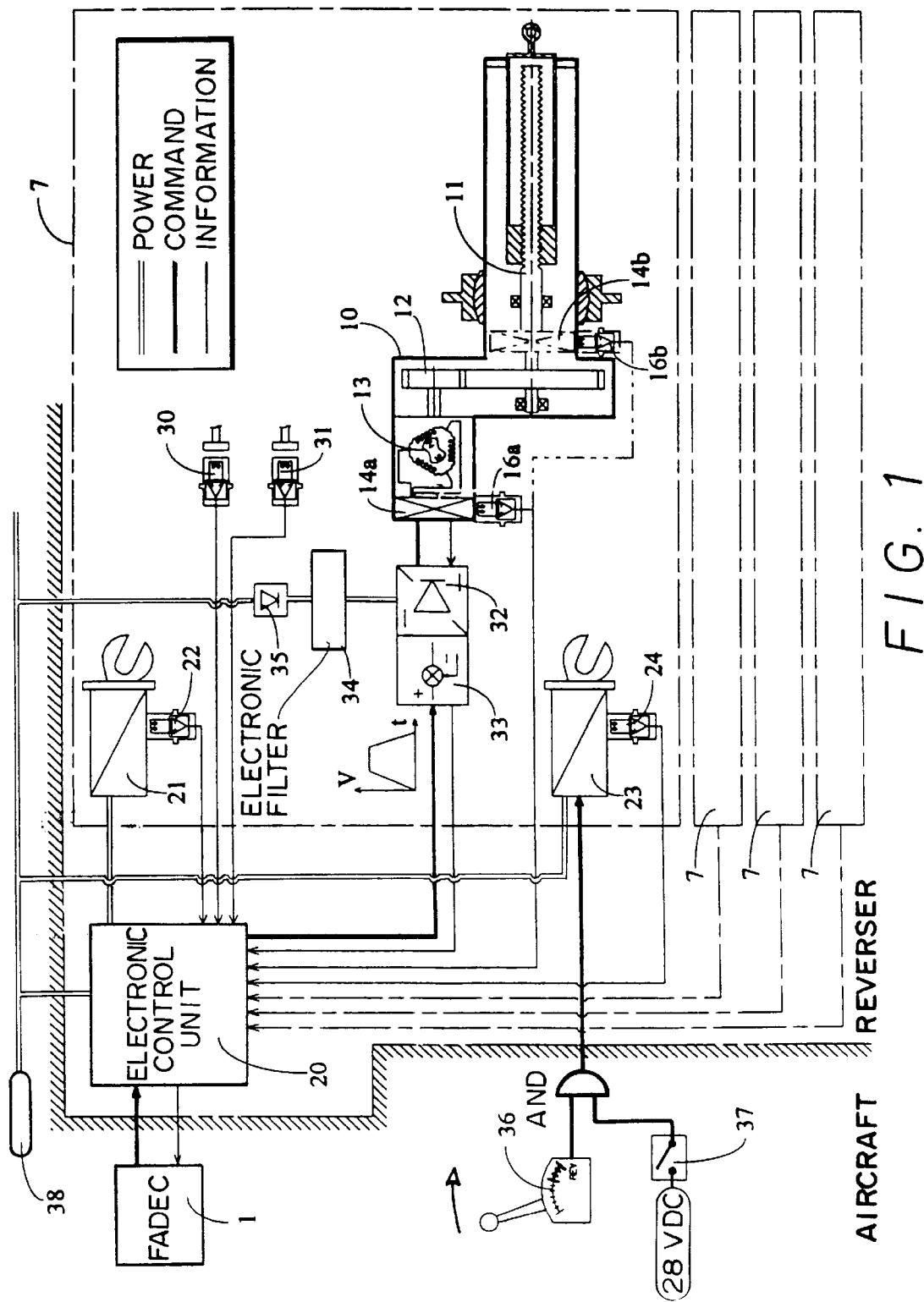
FIG. 1 is a schematic diagram illustrating the electric control system according to the present invention.

The electric control system according to the present invention is schematically illustrated in FIG. 1 wherein it can be seen that the system comprises four identical sets of electromechanical drive devices 7 each connected to an electronic control unit 20 and each connected to one movable reverse thrust component. Although the system will be described as comprising four identical sets of electromechanical drive devices, it is to be understood that more or less than this number may be utilized without exceeding the scope of this invention. The number of electromechanical drive devices may vary according to each specific application of the electric control system.

The electronic control unit 20 is electrically connected to the electronic regulation system 1 controlling the aircraft engine (FADEC) and which controls the electromechanical drive devices. The electronic control unit 20 may be integrated into the FADEC system.

The electromechanical drive devices 7 and the electronic control unit 20 are electrically powered through electrical power harnesses connected either to the power supply 38 of the associated aircraft, or to an electrical generator (not shown) driven by the aircraft engine.

One of the electromechanical drive devices 7 is illustrated in detail in FIG. 1 an it is to be understood that the other electromechanical devices are identical. Each of the drive devices 7 comprises a linear electric actuator 10, at least one primary electric lock 21 which locks the movable thrust reverser component in the forward thrust position, and sensors 16a, 16b, 22, 24, 30 and 31 for monitoring the status of the drive devices, the position of the movable thrust reverser component and the status of the locking devices. Such sensors may comprise known proximity or position sensors.

The linear actuator 10 comprises a screw jack having a rotatable transmission screw 11 the rotation of which linearly drives a portion of the actuator which is connected to the movable thrust reverser component to move the component between its forward and reverse thrust positions. The transmission screw may have a plain screw thread, or be fitted with rollers or balls in known fashion. The transmission screw 11 may be self-locking such that stopping the rotation of the transmission screw 11 will hold the movable component in any desired position. The pitch and diameter of the transmission screw thread will be selected according to the desired operational speeds to be imparted to the movable thrust reverser component.

The transmission screw 11 is rotated by electric motor 13 which may rotate the transmission screw at either a constant speed, or a controlled, variable speed. The electric motor 13 is controlled by the control unit 20. The electric motor 13 may comprise a self-regulating synchronous motor, or it may be an asynchronous or any other known type of electric motor. If the electric motor 13 is a self-regulated synchronous motor, electric power unit consisting of a power bridge 32 and a servo malfunction circuit 33 are connected between the motor and the electronic control unit 20. Electronic filter 34 and a rectifier 35 are also utilized, the rectifier are being utilized when the aircraft power supply is alternating current (AC).

A step down gear system 12 connects the output shaft of the electric motor 13 to the transmission screw 11. Although an epicycloidal gear train is illustrated, other known types of gear systems can be utilized without exceeding the scope of the invention. The linear actuator 10 can be made self-locking by utilizing a wheel and a worm in the step-down gear system 12.

A secondary lock can also be integrated into the linear actuator 10. The secondary lock may comprise a lock or a braking system 14a associated with the electric motor 13, the step-down gear system 12, or the linear actuator 10. Also, a non-electric brake 14b may be applied to the transmission screw 11. The secondary lock absorbs the loads exerted on the linear actuator by the thrust reverser component in case of malfunction or failure of the primary lock 21.

A tertiary electric lock 23 may also be included to hold the movable thrust reverser component in the forward thrust position in case of failure or malfunction of the primary and secondary locks. The tertiary lock is directly controlled from the aircraft cockpit by means of a known thrust reverser contol lever 36 in conjunction with current flight data which may be provided by position sensors 37 present in the aircraft, such position sensors being, for instance, wheel-on ground sensors, altitude sensors, and/or aircraft speed sensors. The primary and tertiary locks 21 and 23 each comprise a mechanical latching system which can be locked and unlocked by electrical means, such as an electromagnet, or an electric motor which may be an asynchronous motor or a torque motor.

The locked or unlocked status of the primary lock 21, the secondary locks 14a or 14b, and the tertiary lock 23 is monitored by proximity sensors 22, 16a or 16b and 24, respectively. Status sensors 30 and 31 are also provided to provide data to the electronic control unit 20 regarding the position of the movable thrust reverser component. One of the sensors provides an indication that the movable component is in its forward thrust position, while the other of the sensors indicates when the movable component is in its reverse thrust position. All of the sensors may be, in known fashion, equipped with a self-testing system connected to the electronic control unit 20 in order to detect any sensor malfunction and thereby avoid false alarms due to inaccurate sensor signals. The electronic control unit then transmits the required information to the aircraft cockpit.

The electronic control unit 20 is powered by electrical power from the aircraft power supply 38 and converts the thrust reverser open and close commands issued by the aircraft control (FADEC) into control sequences for the primary lock 21, and the electric motor 13 of the linear actuator 10 for each set of the electromechanical drive devices 7. The control for the primary lock 21 are on/off signals, analog or digital, which are not susceptible to external electromagnetic interference. The control signals may be electrical or optic signals, or any other known kind of signal which can be electronically decoded. When the motor 13 comprises a self-regulating synchronous motor, the control of the actuators driving the movable thrust reverser component is implemented by transmitting a speed set point to the motor 13. The electronic control unit 20 also provides data to the aircraft control system (FADEC) regarding the status of the various drive devices and the position of the movable thrust reverser component. Such information issues from the status sensors 30, 31, 16a, 16b, 22 and 24, and are transmitted to the aircraft control system by the electronic control unit 20.

The various components of the electric control system are interconnected to each other, or to the aircraft power supply by electric power harnesses, or by control and monitoring harnesses which may be electric harnesses or optical harness including fiber optic transmission lines.

An electric power supply for the electric control system may be fitted with an automatic shut-off device to prevent any premature movable thrust reverser component in case of fire. The automatic shut-off may comprise electrical circuit fuses, circuit breakers, or any other known devices.

The displacement of the movable thrust reverser component may be partially or totally synchronized by the electronic control unit without the need of additional mechanical means. In installations having a plurality of movable thrust reverser components, the timing of the movements of the individual components may be achieved by the electronic control unit to open or close in a predetermined sequence, or to open or close simultaneously. The displacements of the movable components may also be synchronized by mechanical devices, such as a synchronizing cable. In such cases, the mechanical synchronizing devices for the movable components may be combined with an electro-magnetically driven lock, or with an electric motor connected to the synchronizing cable.

The electrically controlled open and close sequence for the movable thrust reverser components will be described in conjunction with the use of primary, secondary and tertiary locks, as illustrated in FIG. 1. It will be assumed initially that the movable thrust reverser component is locked in its forward thrust position. The first operational sequence unlocks the tertiary lock 23 and is directly controlled by the thrust reverser lever 36 and the aircrafts status sensors 37. When the tertiary locks 23 have been unlocked, status sensors 24 associated with the tertiary locks transmits a signal to the electronic control 20 to inform it that the tertiary locks are unlocked. Upon receiving this signal, the electronic control unit applies electric power to the motors 13 of the actuators 10 and transmits an unlocking command to unlock the secondary locks 14a or 14b. Status sensors 16a or 16b associated with the secondary locks provide information to the electronic control unit that the secondary locks are unlocked. Upon receiving this signal, the electronic control unit 20 commands any super-retraction of the secondary locks and commands the unlocking of the primary locks 21. Status sensors 22 associated with the primary locks 21 inform the electronic control unit 20 when the primary locks are unlocked. Upon receiving this signal, the electronic control unit 20 commands the linear actuators 10 to actuate such that the movable thrust reverser components will open according to the predetermined speed profile, or according to an on/off signal. If any on/off signal is utilized, it may be provided digitally.

As soon as the movable thrust reverser components are no longer fully closed in their forward thrust positions, sensor 30 will transmit this information to the electronic control unit. When the movable thrust reverser component reaches the fully opened, reverse thrust position, sensor 31 will transmit this information to the electronic control unit 20 which then commands the shutting off of the electric power to the linear actuators 10. Such a power shut-off locks the thrust reverser movable component in the reverse thrust position by secondary locks 14a, or 14b integrated into the linear actuators 10.

The closing sequences of the movable thrust reverser components are the reverse of the foregoing sequence. Initially, the electronic control unit 20 responds to the command inputs of the aircraft regulating control system 1 to send electric power to the motors 13 of the linear actuators 10 and implements the unlocking of the secondary locks 14a, or 14b. After the status of these secondary locks are forwarded to the electronic control unit by sensors by 16a, or 16b, linear actuator 10 begins moving the movable components toward their forward thrust positions. Sensor 31 will transmit information to the electronic control unit 20 when the thrust reverser components are no longer in their fully opened, reverse thrust positions and sensor 30 will transmit information to the electronic control unit 20 indicating when the movable components are in their fully closed, forward thrust positions. The electronic control unit 20 then transmits signals to the primary lock 21 and to the tertiary lock 23 to move these locks to their locked positions. The information regarding the status of these locks is transmitted to the electronic control unit 20 by sensors 22 and 24, respectively. Once the electronic control unit 20 has information indicating that the primary and tertiary locks are in their locked positions, electrical power to the linear actuators 10 is then shut off.

It is to be noted that the number of locks is not restricted to three, as previously described, and that the opening and closing sequences may be varied to reflect the actual number of locks utilized. If a tertiary lock is not utilized, the unlocking control of the secondary locks should be implemented upon receiving an open signal from the aircraft cockpit and a corresponding signal from the position sensors mounted in the aircraft.

The electric control system according to the present invention may be applied to pivoting door-type thrust reversers, as well as cascade-type thrust reversers. The advantages over the known system of the electronic control are the same regardless of the type of thrust reverser utilized. If the system is utilized in a cascade-type thrust reverser, the linear actuators 10 of the control system will move sliding cowl portions, in known fashion. The actuators may also be interconnected and synchronized by synchronizing cables. However, the actuator synchronization may also be implemented by electronically controlling the motor speed of the linear actuator, and/or the displacement of the movable part of the linear actuator. The linear actuators 10 may also each have an electric motor, or an electric motor may drive a plurality of liner actuators. If synchronization cables are utilized, locks controlled by an electromagnet, or by an electric motor, may be applied to the synchronization cables.

The invention may also be applied to thrust reversers having clam shell doors located at the rearmost end portion of the engine cowling. In this instance, the linear actuators may be located in lateral stationary cowling portions and may transmit their movement to the clamshell doors by means of linkrods, or the like.

The use of the presently described electronic control system offers many advantages. To achieve a full closure of the thrust reverser in all flight phases of the aircraft and under all engine operating conditions, it is possible to vary the performance of the electric actuators 10 without requiring additional structure simply by changing the power of the electric motor 13. Using linear actuators having selflocking transmission screws eliminates the danger of the inadvertent deployment of the thrust reverser movable component toward the reverse thrust position, and further allows positioning and locking the movable components in any position between the fully closed, forward thrust position and the fully open, reverse thrust position. The electronic control unit also enables the movable components to be partially or fully deployed to thereby alter the magnitude of the reverse thrust forces when the aircraft is moving on the ground.

The replacement of hydraulic pipes of the known thrust reverser actuating systems reduces maintenance problems and costs, and eliminates the necessity of using highly corrosive and flammable hydraulic fluid. The elimination of the use of flammable hydraulic fluid also enables the elimination of the associated protection devices to protect against hydraulic leaks and possible fires.

The foregoing description is provided for illustrative purposes only and should note be construed as in any way limited this invention, the scope of which is defined solely by the appended claims.

We claim:

1. An electric control system for a turbojet engine thrust reverser having at least one movable component movable between a forward thrust position and a reverse thrust position, the system comprising:

a) at least one electromechanical drive device mechanically connected to the at least one movable component such that actuation of the electromechanical drive device moves the at least one component between the forward and reverse thrust positions, the electromechanical drive device comprising a screw jack linear actuator having a movable element moving the at least one component between the forward and reverse thrust positions and an electric drive motor electrically connected to an electronic control unit;

b) the electronic control unit electrically connected to the at least one electromechanical drive device and to a turbojet engine control system to transmit actuation signals to the at least one electromechanical drive device to thereby control the movement of the at least one component between the forward and reverse thrust position; and, c) a step-down near drive mechanism connected between the electric drive motor and the screw jack linear actuator.

2. The electric control system of claim 1 wherein the electromechanical drive device further comprises:

a primary lock releasably engaging the at least one component when in the forward thrust position to releasably lock the at least one component in the forward thrust position, the primary lock controllably connected to the electronic control unit.

3. The electric control system of claim, 2 further comprising:

a) a first sensor electrically connected to the electronic control unit so as to inform the electronic control unit when the at least one component is in the forward thrust position; and, b) a second sensor electrically connected to the electronic control unit so as to inform the electronic control unit when the at least one component is in the reverse thrust position.

4. The electronic control system of claim 3 further comprising a third sensor electrically connected to the electronic control unit so as to inform the electronic control unit of the position of the primary lock.

5. The electric control system of claim 2 further comprising:
  a) a secondary lock movable between locked and released positions acting on the electromechanical drive device to releasably lock the electromechanical drive device; and,
  b) a secondary lock sensor electrically connected to the electronic control unit to inform the electronic control unit of the position of the secondary lock.

6. The electric control system of claim 5 wherein the secondary lock comprises a braking device acting on the electric drive motor.

7. The electric control system of claim 5 wherein the linear actuator comprises a screw-jack linear actuator and wherein the secondary lock comprises a braking device acting on the screw jack linear actuator.

8. The electric control system of claim 5 wherein the turbojet engine has a reverse thrust control and further comprising a tertiary lock movable between locked and released positions releasably engaging the at least one component when in the forward thrust position, the tertiary lock being controlled by the reverse thrust control of the turbojet engine.

9. The electric control system of claim 8 further comprising a tertiary lock sensor electrically connected to the electronic control unit so as to inform the electronic control unit of the position of the tertiary lock.

10. The electric control system of claim 2 wherein the electric drive motor comprises a self-regulating synchronous motor.

11. The electronic control system of claim 10 further comprising a power bridge and a malfunction sensory circuit electrically connected between the electric drive motor and the electronic control unit.

12. The electric control system of claim 1 wherein he screw jack linear actuator is self-locking.

13. The electric control system of claim 1 wherein the turbojet engine is located on an aircraft having an electrical power supply and wherein the electromechanical drive device and the electronic control unit are electrically connected to the electrical power supply of the aircraft.

14. The electronic control system of claim 1 wherein the thrust reverser has a plurality of movable components, each movable component having a separate electromechanical drive device, the actuation of the electromechanical drive devices being synchronized by the electronic control unit.

* * * * *